(12) United States Patent
B et al.

(10) Patent No.: US 10,001,938 B2
(45) Date of Patent: Jun. 19, 2018

(54) SYSTEMS AND METHODS FOR OPTIMIZED UTILIZATION OF STORAGE RESOURCES BASED ON PERFORMANCE AND POWER CHARACTERISTICS

(71) Applicant: Dell Products L.P., Round Rock, TX (US)

(72) Inventors: Kanaka Charyulu B, Bangalore (IN); Deepu Syam Sreedhar M, Calicut (IN); Sandeep Agarwal, Bangalore (IN); Gary E. Billingsley, Austin, TX (US); Abhijit Rajkumar Khande, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 113 days.

(21) Appl. No.: 14/990,453

(22) Filed: Jan. 7, 2016

(65) Prior Publication Data
US 2017/0199690 A1 Jul. 13, 2017

(51) Int. Cl.
*G06F 12/00* (2006.01)
*G06F 3/06* (2006.01)

(52) U.S. Cl.
CPC .......... *G06F 3/0625* (2013.01); *G06F 3/0665* (2013.01); *G06F 3/0689* (2013.01)

(58) Field of Classification Search
CPC ..... G06F 1/3203; G06F 1/3206; G06F 9/5094
See application file for complete search history.

(56) References Cited

U.S. PATENT DOCUMENTS

| 7,082,495 B2 | 7/2006 | DeWhitt et al. |
| 8,713,280 B2 | 4/2014 | Anderson et al. |
| 2008/0133831 A1 | 6/2008 | Delaney et al. |
| 2013/0080621 A1* | 3/2013 | Jain ............... G06F 9/5094 709/224 |

FOREIGN PATENT DOCUMENTS

CN    103268147 A    8/2013

* cited by examiner

*Primary Examiner* — David X Yi
*Assistant Examiner* — Arvind Talukdar
(74) *Attorney, Agent, or Firm* — Jackson Walker L.L.P.

(57) ABSTRACT

In accordance with embodiments of the present disclosure, a method may include receiving requirements for building a virtual storage resource from an array of physical storage resources, receiving performance metrics and power metrics of the physical storage resources of the array available for inclusion in the virtual storage resource, determining a plurality of unique combinations of the available physical storage resources that could be used to build the virtual storage resource, determining an effective performance, an effective performance penalty, a total power consumption, and an effective power penalty for each of the plurality of unique combinations, and selecting a single combination of the plurality of unique combinations for the virtual storage resource based on effective performances, effective performance penalties, total power consumptions, and effective power penalties of the plurality of unique combinations.

12 Claims, 3 Drawing Sheets

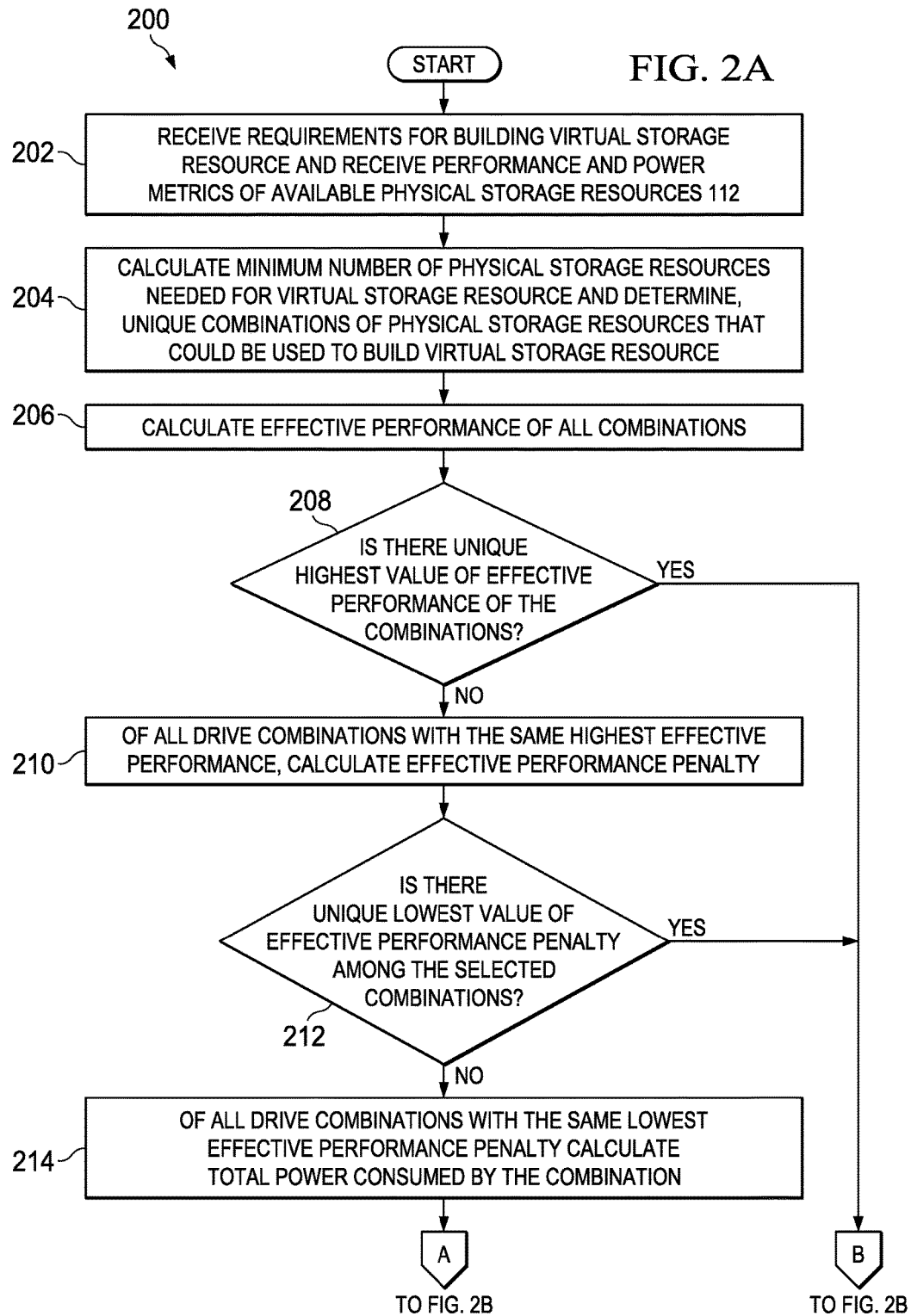

SYSTEMS AND METHODS FOR OPTIMIZED UTILIZATION OF STORAGE RESOURCES BASED ON PERFORMANCE AND POWER CHARACTERISTICS

TECHNICAL FIELD

The present disclosure relates in general to information handling systems, and more particularly to improving optimizing utilization of storage resources.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In data storage systems, users of different storage technologies store enormous amounts of data on different storage devices. From a storage array of storage devices, a user may choose any combination of the storage devices to create a virtual storage resource or logical unit. As a result, physical storage resources of different speeds (e.g., in terms of input/output operations per second or "IOPS") may reside in the same virtual storage resource. This may be unbeneficial as performance of higher-speed physical storage resources of the virtual storage resource may be unutilized as the overall performance of the virtual storage resource may be limited by the physical storage resource of the virtual storage resource having the lowest speed. In addition, even when a combination of physical storage resources as chosen by a user may have the highest speed, it is possible that the combination may not provide the lowest power consumption.

SUMMARY

In accordance with the teachings of the present disclosure, the disadvantages and problems associated with creating of virtual storage resources may be reduced or eliminated.

In accordance with embodiments of the present disclosure, an information handling system may include a processor and a storage controller configured. The storage controller may be configured to receive requirements for building a virtual storage resource from an array of physical storage resources communicatively coupled to the storage controller, receive performance metrics and power metrics of the physical storage resources of the array available for inclusion in the virtual storage resource, determine a plurality of unique combinations of the available physical storage resources that could be used to build the virtual storage resource, determine an effective performance, an effective performance penalty, a total power consumption, and an effective power penalty for each of the plurality of unique combinations, and select a single combination of the plurality of unique combinations for the virtual storage resource based on effective performances, effective performance penalties, total power consumptions, and effective power penalties of the plurality of unique combinations.

In accordance with these and other embodiments of the present disclosure, a method may include receiving requirements for building a virtual storage resource from an array of physical storage resources, receiving performance metrics and power metrics of the physical storage resources of the array available for inclusion in the virtual storage resource, determining a plurality of unique combinations of the available physical storage resources that could be used to build the virtual storage resource, determining an effective performance, an effective performance penalty, a total power consumption, and an effective power penalty for each of the plurality of unique combinations, and selecting a single combination of the plurality of unique combinations for the virtual storage resource based on effective performances, effective performance penalties, total power consumptions, and effective power penalties of the plurality of unique combinations.

In accordance with these and other embodiments, an article of manufacture may include a non-transitory computer-readable medium and computer-executable instructions carried on the computer-readable medium, the instructions readable by a processor. The instructions, when read and executed, may cause the processor to receive requirements for building a virtual storage resource from an array of physical storage resources, receive performance metrics and power metrics of the physical storage resources of the array available for inclusion in the virtual storage resource, determine a plurality of unique combinations of the available physical storage resources that could be used to build the virtual storage resource, determine an effective performance, an effective performance penalty, a total power consumption, and an effective power penalty for each of the plurality of unique combinations, and select a single combination of the plurality of unique combinations for the virtual storage resource based on effective performances, effective performance penalties, total power consumptions, and effective power penalties of the plurality of unique combinations.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIGS. 2A and 2B illustrate a flow chart of an example method for optimized utilization of storage resources in a storage array, in accordance with embodiments of the present disclosure.

DETAILED DESCRIPTION

Figure 1:
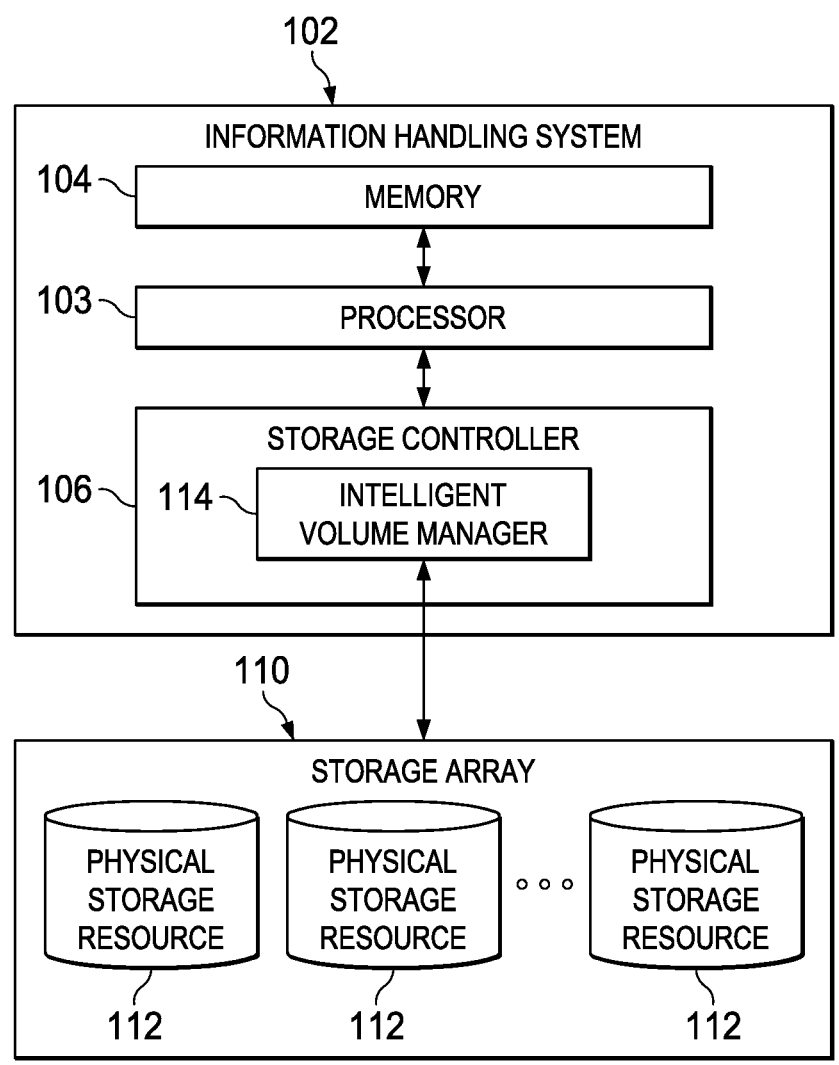
FIG. 1 illustrates a block diagram of an example system having an information handling system coupled to a storage array, in accordance with embodiments of the present disclosure.

Preferred embodiments and their advantages are best understood by reference to FIGS. 1 and 2, wherein like numbers are used to indicate like and corresponding parts. For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input and output ("I/O") devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, buses, memories, input-output devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory ("RAM"), read-only memory ("ROM"), electrically erasable programmable read-only memory ("EEPROM"), and/or flash memory; as well as communications media such as wires, optical fibers, microwaves, radio waves, and other electromagnetic and/or optical carriers; and/or any combination of the foregoing.

Information handling systems often use an array of physical storage resources (e.g., disk drives), such as a Redundant Array of Independent Disks ("RAID"), for example, for storing information. Arrays of physical storage resources typically utilize multiple disks to perform input and output operations and can be structured to provide redundancy which may increase fault tolerance. Other advantages of arrays of physical storage resources may be increased data integrity, throughput and/or capacity. In operation, one or more physical storage resources disposed in an array of physical storage resources may appear to an operating system as a single logical storage unit or "logical unit." Implementations of physical storage resource arrays can range from a few physical storage resources disposed in a chassis, to hundreds of physical storage resources disposed in one or more separate storage enclosures.

FIG. 1 illustrates a block diagram of an example system 100 having an information handling system 102 coupled to a storage array 110, in accordance with embodiments of the present disclosure.

In some embodiments, information handling system 102 may comprise a server. In these and other embodiments, information handling system 102 may comprise a personal computer. In other embodiments, information handling system 102 may be a portable computing device (e.g., a laptop, notebook, tablet, handheld, smart phone, personal digital assistant, etc.). In yet other embodiments, information handling system 102 may comprise a storage enclosure for housing one or more physical storage resources. As depicted in FIG. 1, information handling system 102 may include a processor 103, a memory 104 communicatively coupled to processor 103, and a storage controller 106 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage array 110, and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Storage controller 106 may include any system, apparatus, or device operable to manage the communication of data between processor 103 and storage resources 112 of storage array 110. In certain embodiments, storage controller 106 may provide functionality including, without limitation, disk aggregation and redundancy (e.g., RAID), I/O routing, and error detection and recovery. Storage controller 106 may also have features supporting shared storage and high availability. In some embodiments, storage controller 106 may comprise a PowerEdge RAID Controller (PERC) manufactured by Dell Inc. Although storage controller 106 is depicted as integral to information handling system 102, in some embodiments, storage controller 106 may be located within a housing or enclosure other than that of information handling system 102, such as a storage enclosure comprising one or more physical storage resources 112 of storage array 110.

As shown in FIG. 1, storage controller 106 may comprise an intelligent volume manager 114. Intelligent volume manager 114 may comprise any suitable system, device, or apparatus configured to optimize utilization of physical storage resources 112 used to build virtual storage resources, as described in greater detail below. Intelligent volume manager 114 may be implemented in firmware, software, hardware, or any combination thereof. For example, in some embodiments, intelligent volume manager 114 may be embodied in a program of instructions (e.g., firmware or software) which may be read and executed by control logic of storage controller 106.

In addition to processor 103, memory 104, and storage controller 106, information handling system 102 may include one or more other information handling resources.

Storage array 110 may include a plurality of physical storage resources 112. In some embodiments, storage array 110 may comprise a storage area network or "SAN." Although FIG. 1 depicts storage array 110 directly coupled to information handling system 102, in some embodiments, storage array 110 may be coupled to information handling system 102 via a network. In other embodiments, one or more physical storage resources 112 of storage array 110 may reside in a housing or other enclosure for information handling system 102, in which case information handling system 102 may comprise a storage enclosure.

Physical storage resources 112 may include one or more hard disk drives, magnetic tape libraries, optical disk drives, magneto-optical disk drives, compact disk drives, compact disk arrays, disk array controllers, and/or any other system, apparatus or device operable to store media. In operation, storage controller 106 may configure one or more physical storage resources 112 to appear to an operating system or virtual machine executing on information handling system 102 as a single logical storage unit or virtual storage resource (which may also be referred to as a "LUN" or a "volume").

Additionally, in operation, prior to creating a virtual storage resource responsive to a user request to do so, intelligent volume manager 114 may determine one or more parameters (e.g., performance metrics, power metrics, etc.) for candidate physical storage resources 112 of the virtual storage resource, and intelligently select a combination of physical storage resources 112 so as to optimize effective performance metrics and/or power metrics of the virtual storage resource, as described in greater detail below.

Figure 2B:
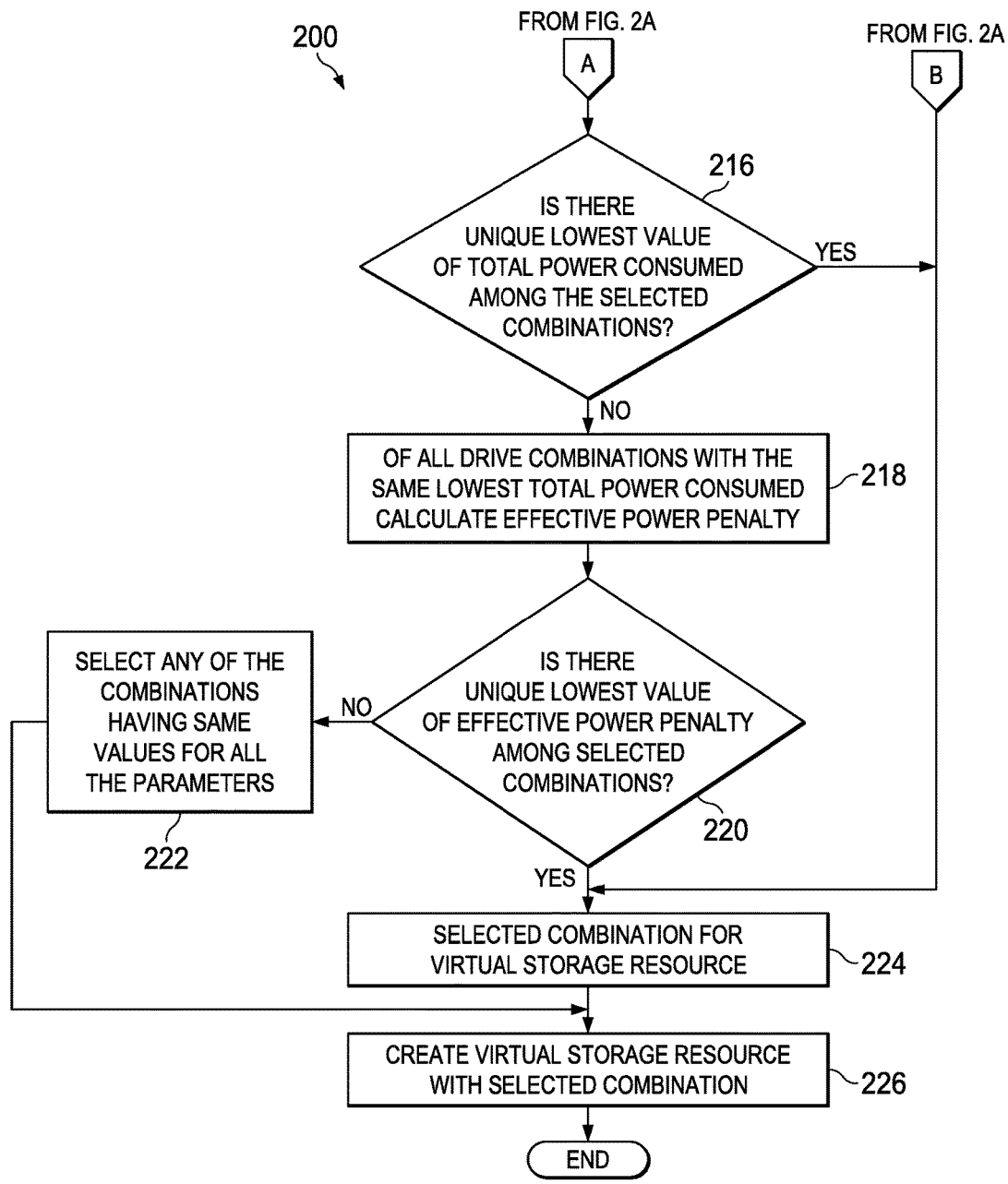

FIGS. 2A and 2B illustrate a flow chart of an example method 200 for optimized utilization of storage resources 112 in a storage array 110, in accordance with embodiments of the present disclosure. According to certain embodiments, method 200 may begin at step 202. As noted above, teachings of the present disclosure may be implemented in a variety of configurations of system 100. As such, the preferred initialization point for method 200 and the order of the steps comprising method 200 may depend on the implementation chosen.

At step 202, intelligent volume manager 114 may receive requirements for building a virtual storage resource and performance and power metrics of available physical storage resources 112 of storage array 110. Requirements for building the virtual storage resource may include a RAID level for the virtual storage resource, a storage capacity of the virtual storage resource, and one or more other requirements. "Available" physical storage resources 112 may comprise physical storage resources 112 which are not already allocated as members of another virtual storage resource. The performance and power metrics of the available storage resources 112 may include, for each storage resource 112, a performance or "speed" of such storage resource in terms of input/output operations per second ("IOPS") or other metric and an amount of power consumed by such physical storage resource 112 during operation.

At step 204, intelligent volume manager 114 may calculate a minimum number of physical storage resources 112 needed to build the virtual storage resource and based thereon, determine a plurality of unique combinations of the available storage resources 112 that could be used to build the virtual storage resource.

At step 206, intelligent volume manager 114 may calculate an effective performance of each of the combinations. For example, in some embodiments, an effective performance of a combination may be the performance of the lowest-performing physical storage resource 112 of such combination.

At step 208, intelligent volume manager 114 may determine if a unique highest value of effective performance exists among the values of effective performance of the various combinations. If such a unique highest value of effective performance exists, method 200 may proceed to step 224, where the combination having the unique highest value of effective performance may be selected as the combination for the virtual storage resource. Otherwise, if no unique highest value of effective performance exists, method 200 may proceed to step 210.

At step 210, intelligent volume manager 114 may, from all of the combinations having the same highest value of effective performance, calculate an effective performance penalty for each of such combinations, wherein an effective performance penalty represents an aggregate amount of performance unutilized by a combination when operating at its effective performance. For example, in some embodiments, an effective performance penalty may be given by the equation:

$$PerfPen = \sum_{i=1}^{N} (Performance_i - Performance_{min})$$

where PerfPen is the effective performance penalty, N is the number of physical storage resources 112 of the combination, $Performance_i$ is the performance of an individual physical storage resource 112, and $Performance_{min}$ is the performance of the lowest performing physical storage resource 112 of the combination.

At step 212, intelligent volume manager 114 may determine if a unique lowest value of effective performance penalty exists among the values of effective performance penalty of the various combinations. If such a unique lowest value of effective performance penalty exists, method 200 may proceed to step 224, where the combination having the unique lowest value of effective performance penalty may be selected as the combination for the virtual storage resource. Otherwise, if no unique lowest value of effective performance penalty exists, method 200 may proceed to step 214.

At step 214, intelligent volume manager 114 may, from all of the combinations having the same lowest value of effective performance penalty, calculate a total power consumption for each of such combinations, wherein the total power consumption for a combination represents the cumulative power consumption by the physical storage resources 112 of the combination.

At step 216, intelligent volume manager 114 may determine if a unique lowest value of total power consumption exists among the values of total power consumption of the various combinations. If such a unique lowest value of total power consumption exists, method 200 may proceed to step

224, where the combination having the unique lowest value of total power consumption may be selected as the combination for the virtual storage resource. Otherwise, if no unique lowest value of total power consumption exists, method 200 may proceed to step 218.

At step 218, intelligent volume manager 114 may, from all of the combinations having the same lowest value of total power consumption, calculate an effective power penalty for each of such combinations, wherein an effective power penalty represents an aggregate amount of power wasted by a combination. For example, in some embodiments, an effective power penalty may be given by the equation:

$$PowerPen = \sum_{i=1}^{N} (Power_i - Power_{min})$$

where PowerPen is the effective power penalty, N is the number of physical storage resources 112 of the combination, $Power_i$ is the power consumed by an individual physical storage resource 112, and $Power_{min}$ is the power consumed by the physical storage resource 112 of the combination that consumes the least amount of power.

At step 220, intelligent volume manager 114 may determine if a unique lowest value of effective power penalty exists among the values of effective power penalty of the various combinations. If such a unique lowest value of effective power penalty exists, method 200 may proceed to step 224, where the combination having the unique lowest value of effective power penalty may be selected as the combination for the virtual storage resource. Otherwise, if no unique lowest value of effective power penalty exists, method 200 may proceed to step 222.

If method 200 reaches step 222, then there will exist more than one combination of physical storage resources 112 that have identical effective performance, effective performance penalty, total power consumed, and effective power penalty. Accordingly, at step 222, intelligent volume manager 114 may select any of such combinations as the combination for the virtual storage resource. After completion of step 222, method 200 may proceed to step 226.

At step 224, intelligent volume manager 114, responsive to a determination made at any of steps 208, 212, 216, and 220 that a particular combination has a uniquely superior measure of a relevant parameter (e.g., effective performance, effective performance penalty, total power consumed, or effective power penalty), may select such particular combination for the virtual storage resource.

At step 226, intelligent volume manager 114 may create the virtual storage resource using the combination of physical storage resources 112 selected at step 222 or step 224. After completion of step 226, method 200 may end.

Although FIGS. 2A and 2B disclose a particular number of steps to be taken with respect to method 200, it may be executed with greater or fewer steps than those depicted in FIGS. 2A and 2B. In addition, although FIGS. 2A and 2B disclose a certain order of steps to be taken with respect to method 200, the steps comprising method 200 may be completed in any suitable order.

Method 200 may be implemented using system 100, components thereof or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising: a processor; and a storage controller coupled to the processor, implemented in hardware, and configured to: receive requirements for building a virtual storage resource from an array of physical storage resources communicatively coupled to the storage controller;

receive performance metrics and power metrics of the physical storage resources of the array that are available for inclusion in the virtual storage resource and are not already included in an existing virtual storage resource;

determine a plurality of unique combinations of the available physical storage resources that could be used to build the virtual storage resource; determine an effective performance, an effective performance penalty, a total power consumption, and an effective power penalty for each of the plurality of unique combinations;

select a single combination of the plurality of unique combinations for the virtual storage resource based on effective performances, effective performance penalties, total power consumptions, and effective power penalties of the plurality of unique combinations, wherein the selecting includes: responsive to determining that a set of two or more of the plurality of unique combinations have identical effective performances greater than the effective performances of all unique combinations other than the combinations having identical effective performances, selecting a particular one of the combinations from the set if the effective performance penalty of the particular combination is lesser than the effective performance penalties of all of the other combinations of the set; and cause the single combination of the available physical storage resources to be built as the virtual storage resource;

wherein, subsequent to the building of the virtual storage resource, the physical storage resources in the single combination are not available for inclusion in another virtual storage resource.

2. The information handling system of claim 1, wherein the storage controller is configured to, in order to select the single combination, select a particular one of the combinations as the single combination if the effective performance of the particular combination is greater than the effective performances of all of the other unique combinations.

3. The information handling system of claim 1, wherein the storage controller is configured to, in order to select the single combination, responsive to determining that a set of two or more of the plurality of unique combinations have identical effective performances greater than the effective performances of all unique combinations other than the combinations having identical effective performances, and determining that a subset of two or more of the set have identical effective performance penalties lesser than the effective performance penalties of all unique combinations in the set other than the combinations having identical effective performance penalties, select a particular one of the combinations from the subset if the total power consumption of the particular combination is lesser than the total power consumption of all of the other combinations of the subset.

4. The information handling system of claim 1, wherein the storage controller is configured to, in order to select the single combination, responsive to determining that a set of two or more of the plurality of unique combinations have identical effective performances greater than the effective performances of all unique combinations other than the combinations having identical effective performances, determining that a subset of two or more of the set have identical effective performance penalties lesser than the effective performance penalties of all unique combinations in the set other than the combinations having identical effective performance penalties, and determining that a further subset of two or more of the subset have identical total power consumptions lesser than the total power consumptions of all unique combinations in the subset other than the combinations having identical total power consumptions, select a particular one of the combinations from the further subset if the effective power penalty of the particular combination is lesser than the effective power penalty of all of the other combinations of the further subset.

5. A method comprising: receiving, at a physical storage controller, requirements for building a virtual storage resource from an array of physical storage resources; receiving, at the physical storage controller, performance metrics and power metrics of the physical storage resources of the array that are available for inclusion in the virtual storage resource; the physical storage controller determining a plurality of unique combinations of the available physical storage resources that could be used to build the virtual storage resource and are not already included in an existing virtual storage resource;

the physical storage controller determining an effective performance, an effective performance penalty, a total power consumption, and an effective power penalty for each of the plurality of unique combinations; the physical storage controller selecting a single combination of the plurality of unique combinations for the virtual storage resource based on effective performances, effective performance penalties, total power consumptions, and effective power penalties of the plurality of unique combinations, wherein the physical storage controller is configured to select the single combination such that, responsive to determining that a set of two or more of the plurality of unique combinations have identical effective performances greater than the effective performances of all unique combinations other than the combinations having identical effective performances, a particular one of the combinations from the set is selected if the effective performance penalty of the particular combination is lesser than the effective performance penalties of all of the other combinations of the set; and the physical storage controller causing the single combination of the available physical storage resources to be built as the virtual storage resource;

wherein, subsequent to the building of the virtual storage resource, the physical storage resources in the single combination are not available for inclusion in another virtual storage resource.

6. The method of claim 5, wherein the physical storage controller is further configured such that selecting the single combination comprises selecting a particular one of the combinations as the single combination if the effective performance of the particular combination is greater than the effective performances of all of the other unique combinations.

7. The method of claim 5, wherein the physical storage controller is further configured such that selecting the single combination comprises, responsive to determining that a set of two or more of the plurality of unique combinations have identical effective performances greater than the effective performances of all unique combinations other than the combinations having identical effective performances, and determining that a subset of two or more of the set have identical effective performance penalties lesser than the effective performance penalties of all unique combinations in the set other than the combinations having identical effective performance penalties, selecting a particular one of the combinations from the subset if the total power consumption of the particular combination is lesser than the total power consumption of all of the other combinations of the subset.

8. The method of claim 5, wherein the physical storage controller is further configured such that selecting the single combination comprises, responsive to determining that a set of two or more of the plurality of unique combinations have identical effective performances greater than the effective performances of all unique combinations other than the combinations having identical effective performances, determining that a subset of two or more of the set have identical effective performance penalties lesser than the effective performance penalties of all unique combinations in the set other than the combinations having identical effective performance penalties, and determining that a further subset of two or more of the subset have identical total power consumptions lesser than the total power consumptions of all unique combinations in the subset other than the combinations having identical total power consumptions, selecting a particular one of the combinations from the further subset if the effective power penalty of the particular combination is lesser than the effective power penalty of all of the other combinations of the further subset.

9. An article of manufacture comprising: a non-transitory computer-readable medium; and computer-executable instructions carried on the computer-readable medium, the instructions readable by a processor, the instructions, when read and executed, for causing the processor to: receive requirements for building a virtual storage resource from an array of physical storage resources; receive performance metrics and power metrics of the physical storage resources of the array that are available for inclusion in the virtual storage resource and are not already included in an existing virtual storage resource;

determine a plurality of unique combinations of the available physical storage resources that could be used to build the virtual storage resource; determine an effective performance, an effective performance penalty, a total power consumption, and an effective power penalty for each of the plurality of unique combinations; select a single combination of the plurality of unique combinations for the virtual storage resource based on effective performances, effective performance penalties, total power consumptions, and effective power penalties of the plurality of unique combinations, such that responsive to determining that a set of two or more of the plurality of unique combinations have identical effective performances greater than the effective performances of all unique combinations other than the combinations having identical effective performances, a particular one of the combinations from the set is selected if the effective performance penalty of the particular combination is lesser than the effective performance penalties of all of the other combinations of the set; and cause the single combination of the available physical storage resources to be built as the virtual storage resource;

wherein, subsequent to the building of the virtual storage resource, the physical storage resources in the single combination are rot available for inclusion in another virtual storage resource.

10. The article of claim 9, the instructions for further causing the processor to, in order to select the single combination, select a particular one of the combinations as the single combination if the effective performance of the particular combination is greater than the effective performances of all of the other unique combinations.

11. The article of claim 9, the instructions for further causing the processor to, in order to select the single combination, responsive to determining that a set of two or more of the plurality of unique combinations have identical effective performances greater than the effective performances of all unique combinations other than the combinations having identical effective performances, and determining that a subset of two or more of the set have identical effective performance penalties lesser than the effective performance penalties of all unique combinations in the set other than the combinations having identical effective performance penalties, select a particular one of the combinations from the subset if the total power consumption of the particular combination is lesser than the total power consumption of all of the other combinations of the subset.

12. The article of claim 9, the instructions for further causing the processor to, in order to select the single combination, responsive to determining that a set of two or more of the plurality of unique combinations have identical effective performances greater than the effective performances of all unique combinations other than the combinations having identical effective performances, determining that a subset of two or more of the set have identical effective performance penalties lesser than the effective performance penalties of all unique combinations in the set other than the combinations having identical effective performance penalties, and determining that a further subset of two or more of the subset have identical total power consumptions lesser than the total power consumptions of all unique combinations in the subset other than the combinations having identical total power consumptions, select a particular one of the combinations from the further subset if the effective power penalty of the particular combination is lesser than the effective power penalty of all of the other combinations of the further subset.

* * * * *